United States Patent [19]

Liberman et al.

[11] Patent Number: 4,666,251

[45] Date of Patent: May 19, 1987

[54] LARGE APERTURE, VERY HIGH TEMPERATURE, HERMETICALLY SEALED OPTICAL WINDOWS

[75] Inventors: Irving Liberman, Pittsburgh; Chi-Sheng Liu, Monroeville; Robert J. Zollweg, Murrysville, all of Pa.

[73] Assignee: Westinghouse Electric Corp., Pittsburgh, Pa.

[21] Appl. No.: 729,606

[22] Filed: May 2, 1985

[51] Int. Cl.⁴ ............................................. G02B 5/00
[52] U.S. Cl. ................................. 350/319; 350/320; 356/244
[58] Field of Search ................. 350/320, 319; 34/242; 138/89; 356/244, 246, 301; 313/325

[56] References Cited

U.S. PATENT DOCUMENTS

| | | | |
|---|---|---|---|
| 3,183,937 | 5/1965 | Earley et al. | |
| 3,420,603 | 1/1969 | Whilems | |
| 3,588,573 | 6/1971 | Chen | 313/325 |
| 3,922,999 | 12/1975 | Meginnis | 350/319 |
| 3,963,054 | 6/1976 | Martin | 138/89 |

*Primary Examiner*—John K. Corbin
*Assistant Examiner*—Loha Ben
*Attorney, Agent, or Firm*—Thomas R. Trempus

[57] ABSTRACT

The invention provides a metal vapor Raman cell structure for laser wavelength conversion and a method for mounting a sapphire window onto a metal tube having a known outside diameter in the manufacture of the aforesaid Raman cell. According to the method of this invention, a sapphire window and a metal tube having a dissimilar coefficient of thermal expansion are mounted and sealed together. The method of sealing the sapphire window onto the metal tube comprises the steps of: (1) cutting a narrow circular groove in one face of the sapphire window; (2) mounting the metal tube into the seat defined by the groove cut into the sapphire window; and (3) disposing a sealing material between the outer face of the seat defined by the groove and the metal tube disposed therein. According to this technique, the sealing material disposed in the groove is placed under compression during the operation of the vapor Raman cell so constructed. The narrow circular groove cut into the sapphire window defines a seat having a bottom portion, an inner face, and an outer face. This seat is adapted to receive therein the metal tube of a known outside diameter. Once the metal tube is mounted into the seat defined by the groove, the sealing material is disposed between the outer face of the seat and the metal tube disposed therein.

14 Claims, 3 Drawing Figures

LARGE APERTURE, VERY HIGH TEMPERATURE, HERMETICALLY SEALED OPTICAL WINDOWS

GOVERNMENT CONTRACT

This invention was made in the performance of a contract with the U.S. Navy, Contract No. N66001-84-C-0238.

BACKGROUND OF THE INVENTION

The present invention is a method for sealing large aperture optical windows onto refractory metal tubing and an improved high temperature, lead vapor Raman cell in which a sapphire window is sealed onto a metal tube.

Various laser communication systems for both military and civilian applications have been proposed in which the laser beam is transmitted through space, the atmosphere, or through water. For example, it has been suggested that blue/green submarine communication can be effected through the use of a lead vapor Raman shifted XeCl laser. However, one of the technological problems resides in the high temperature Raman cell construction. The desired lead vapor pressure is about 100 torr, which corresponds to an equilibrium temperature of 1417° C.; however, a useful device might be obtained at 20 torr, corresponding to a temperature of about 1200° C. These temperatures are above the useful range for quartz containers, and therefore a non-equilibrium lead vapor cell using cooled quartz windows and a hot zone based on heat pipe technology was utilized to demonstrate the viability of the approach. However, there are distinct disadvantages in the use of non-equilibrium lead vapor cells. Long life and reliability are unlikely to be achieved and the turbulence created by flowing gases and thermal gradients tends to degrade the beam quality. Metal vapor lasers and metal vapor Raman cells for laser wavelength conversion require heating the metal to very high temperatures in order to get sufficient vapor pressures. Some metals do not have sufficient vapor pressure below 1100° C. which is above the softening point of quartz. Therefore, a sapphire window sealed onto a refractory metal tube is preferably employed.

In order to successfully seal a sapphire window onto a refractory metal tube certain compromises between a number of different factors based on material properties must be considered. These factors include thermal expansion coefficients, metal ductility and sapphire and sealing frit strength under tensile and compressive forces.

Several techniques have been suggested whereby a window is sealed to a tube to form an optical cell for a gas laser or the like. For example, U.S. Pat. No. 3,420,603 discloses a technique where an abrupt change of thickness between the central portion of the window and the outer portion which is sealed to the tube or bulb provides a stress barrier to prevent distortion of the central portion of the window. U.S. Pat. No. 3,183,937 discloses an optical maser disc mounted to a tube end section by means of inserting the tube into a disc aperture which is provided with a trough. FIG. 1 is illustrative of the conventional sealed geometry utilized in mounting a sapphire window onto a tube wall. The conventional technique for sealing a sapphire window onto a metal tube was to use a slightly oversized tube as at 11, positioned the sapphire window 13 inside the tube wall as at 15 and disposed sealing material 17 therebetween. Because the thermal expansion of the metal tube is smaller than the thermal expansion of the sapphire window, the sealing material during cooling is in tension. The resulting stress, which increases with window diameter, can cause hair line cracks of the seal or the seal-metal interface. U.S. Pat. No. 3,420,603, discussed above, is directed to a technique for alleviating stress at this interface.

It is therefore an object of the present invention to provide a technique whereby a metal vapor Raman cell can be provided with a large aperture hermetically sealed optical window for high temperature applications.

It is another object of this invention to provide a large aperture, very high temperature, hermetically sealed optical window equipped lead vapor Raman cell for laser wavelength conversion.

SUMMARY OF THE INVENTION

The invention provides a metal vapor Raman cell structure for laser wavelength conversion and a method for sealing a sapphire window onto a metal tube having a known outside diameter in the manufacture of the aforesaid Raman cell. According to the method of this invention, a sapphire window and a metal tube having a dissimilar coefficient of thermal expansion are sealed together. The method of sealing the sapphire window onto the metal tube comprises the steps of: (1) cutting a narrow circular groove in one face of the sapphire window; (2) mounting the metal tube into the seat defined by the groove cut into the sapphire window; and (3) disposing a sealing material between the outer face of the seat defined by the groove and the metal tube disposed therein. According to this technique, the sealing material disposed in the groove is placed under compression during the operation of the vapor Raman cell so constructed. The narrow circular groove cut into the sapphire window defines a seat having a bottom portion, an inner face, and an outer face. This seat is adapted to receive therein the metal tube of a known outside diameter. Once the metal tube is mounted into the seat defined by the groove, the sealing material is disposed between the outer face of the seat and the metal tube disposed therein.

Preferably, the cell structure comprises a C-axis sapphire optically flat window and a metal tube which comprises a material selected from the group consisting of niobium, tantalum and molybdenum. The sealing material is preferably held in compression because of the higher compressive strength compared to the tensile strength of most ceramics. The present invention provides a novel sealing geometry that can put the sealing material in compression to improve the reliability of high temperature sapphire-to-metal seals.

BRIEF DESCRIPTION OF THE DRAWINGS

The above as well as other features and advantages of the present invention can be appreciated through consideration of the detailed description of the invention in conjunction with the several drawings in which.

DETAILED DESCRIPTION OF THE INVENTION

Figure 1:
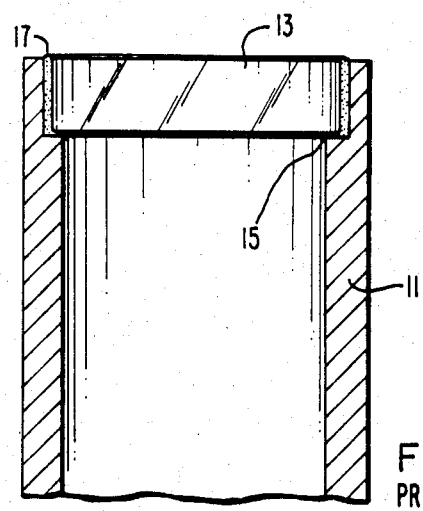
FIG. 1 schematically illustrates prior art sealing geometry.

The present invention provides a large aperture, high temperature window for use at temperatures greater than 1100° C. for incorporation into lasers, Raman cells and other applications. A hermetic window seal is disclosed in which the sealing material is placed under compression. This approach permits the use of large aperture windows which are in excess of one inch in diameter and which can operate at temperatures in excess of approximately 1700° C. Considering FIGS. 2 and 3 there is illustrated a high temperature lead Raman cell design generally indicated by the reference character 21. The Raman cell 21 includes first and second sapphire windows indicated at the reference character 23 and a tubular cell member 25 disposed therebetween. The sapphire window 23 shown in a more detailed cross sectional view in FIG. 3 has a groove cut therein as at 27. The groove or seat 27 forms a circumferentially disposed seat proximate the outside periphery of the window 23. The seat 27 includes a bottom portion 29, and outer face 31 and inner face 33.

A cell tube member 25 has an outside diameter of a predetermined dimension and an inside diameter of a second predetermined dimension. The inside diameter of the innerface 33 of the groove or seat 27 is slightly less than the inside diameter of the cell tube member 25. The groove is adapted to receive the cell tube member therein and to provide a sealing area between the outside surface of the cell 25 and the outer face 31 of the groove 27. A sealing frit 35 is disposed in the annular gap defined between the outside surface 37 of the tubular cell 25 and the outer face 31 of the groove 27.

Figure 2:
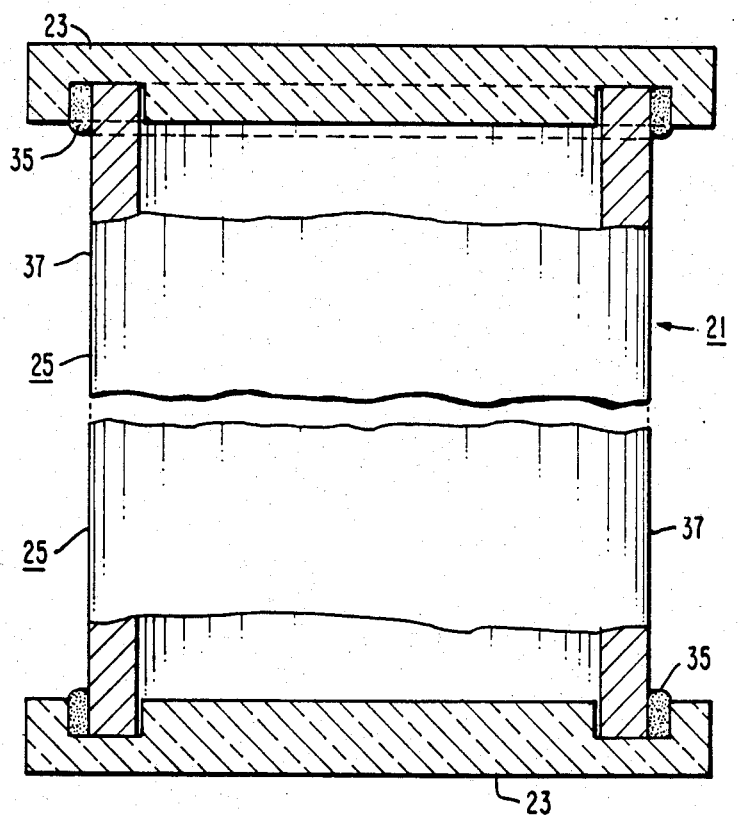
FIG. 2 schematically illustrates the improved sealing geometry of a sapphire window and a metal tube according to the teachings of this invention; employed in a metal vapor Raman cell.

As previously mentioned to successfully seal a sapphire window onto refractory metal tubing, certain compromises between a number of different factors based on material properties must be considered. Such factors include thermal expansion coefficients, metal ductility and sapphire and sealing frit strength under tensile and compressive forces. The geometry of the present design alleviates some of the thermal expansion mismatch and material strength problems. The metal having the closest thermal expansion match to sapphire is niobium, and next to that in closeness of thermal expansion characteristics to sapphire are tantalum and molybdenum. The sealing material should preferably be held in compression because of the higher compressive strength compared to tensile strength of most ceramics. Since niobium, tantalum, and molybdenum all have smaller thermal expansion coefficients than the sapphire at temperatures over 1000° C., the sealing material is always under tension during the cooling cycle in a conventional sealing geometry as illustrated in FIG. 1 in which the metal tube surrounds the sapphire disc. The present invention provides a novel sealing geometry that can put the sealing material in compression in order to improve the reliability of these high temperature sapphire-to-metal seals. According to this new design a narrow circular groove is cut in the window such that the metal tubing to be seated therein can be fit into the groove. A minimum amount of frit is disposed between the outer circle of the groove and the outer wall of the tube in order to seal it, as shown in FIG. 2. In this configuration, the sealing material is not under tensile stress. As a result, large aperture sapphire windows can be sealed onto refractory metal tubes even if some thermal expansion mismatch is present. By large windows what is meant is a window having a one inch or greater diameter.

While as noted above the metal having the closest thermal expansion match to sapphire is niobium, the chemical compatibility of the cell body, window and seals with liquid lead and lead vapor and inert gas fill is, of course, also essential. Accordingly under certain conditions, rather than using the niobium, tantalum may be a better candidate for use as a tubular cell body since it is known to be resistant to lead to at least 1000° C. The ductility of tantalum is similar to that of the niobium, and the thermal expansion mismatch is only slightly poorer. As with niobium, it is essential that a ductile grade of tantalum be obtained and be kept from embrittlement by contaminants during subsequent processing and operation.

The seal design chosen will depend upon the ductility of the metal to accept the stresses from the appreciable thermal expansion mismatch and large diameters employed. If possible, the sealing material will be held in compression because of its higher strength compared to being under tension. It may be desirable to incorporate an intermediate layer between the metal and metal oxide frit in order to improve the interface bond. Thin coatings of silicone, zirconium or titanium which diffuse into the niobium or tantalum cell body have been employed.

The sealing frit to be used can be one of the mixtures of metal oxides that are known to be successful for use in such applications. One of these, based on CaO and $Al_2O_3$ with additions of $Y_2O_3$ and SrO, has withstood repeated cycling at 1000° C.. By way of example, an alumina-yttria eutectic which is disclosed in U.S. Pat. No. 3,588,573 which is assigned to the assignee of the present invention incorporated herein by reference, has a melting point in excess of 1400° C. in the 1600° to 1850° C. range and would be more than adequate for use in the process of this invention.

Figure 3:
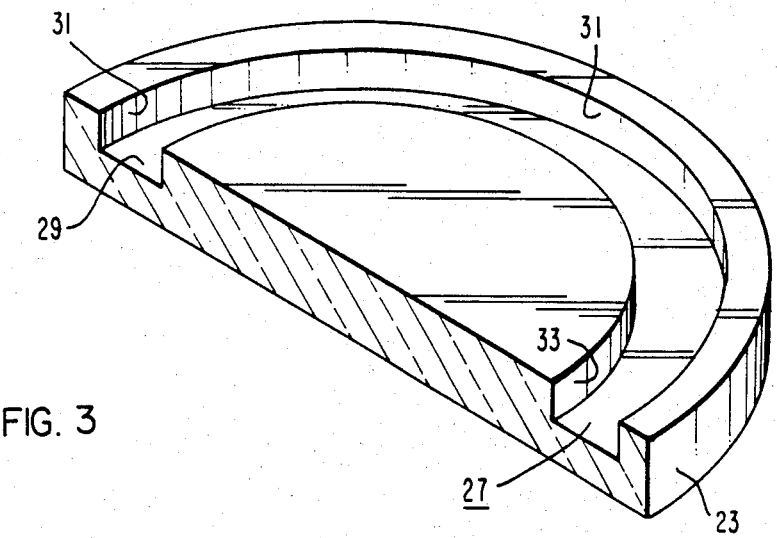
FIG. 3 is a perspective view of a sapphire window prepared in accordance with the teachings of this invention for mounting onto a metal tubular member with portions of the sapphire window cut away.

With the geometry described in conjunction with FIGS. 2 and 3, the metal wall thickness of the tubular member 25 can be held to a minimum in order to reduce the stresses on the sapphire which might otherwise lead to cracks in the sapphire window. This geometry is also advantageous for applications where the cell internal pressure may exceed the external pressure, such as when used in orbital platforms. The groove in the sapphire window is easily and inexpensively made using a diamond impregnated core drill, for example. The thickness of the sapphire can be made arbitrarily large to give the window the desired strength with grooves of sufficient depth to provide a strong leak-tight seal.

What has been described is a large aperture, high temperature window for lasers, Raman cells and other applications, and a unique method for placing the sealing material under compression in such devices.

What is claimed is:

1. A method for sealing a sapphire window onto a metal tube of a known outside diameter in the manufacture of a large aperture, very high temperature lead vapor Raman cell, wherein the sapphire window and the metal tube have dissimilar coefficients of thermal expansion, said method comprising the steps of:

providing a narrow circular groove in one face of the sapphire window, said groove defining a seat having a bottom portion, an inner face and an outer face and adapted to receive therein a metal tube of a known outside diameter;

mounting the metal tube into the seat defined by the groove; and disposing a sealing material between the outer face of the seat and the metal tube disposed therein, wherein said sealing material is an oxide frit seal having a melting point in excess of approximately 1400° C., whereby said sealing material is placed under compression.

2. The method according to claim 1 wherein the metal tube is niobium.

3. The method according to claim 1 wherein the metal tube is tantalum.

4. The method according to claim 1 wherein the metal tube is molybdenum.

5. The method according to claim 1 wherein an intermediate layer is disposed between the metal tube and the sealing material in order to improve the interface bond therebetween.

6. The method according to claim 5 wherein the intermediate layer is selected from the group consisting of silicone, zirconium and titanium.

7. The method according to claim 1 wherein the sapphire window is a C-axis sapphire window.

8. In a lead vapor Raman cell including a metal tubular member having windows disposed at each end thereof, an improved structure for sealing the windows at each end of the tubular member comprising:

a tubular member having an outer wall with a predetermined outside diameter;

a window means disposed at each end of the tubular member, said window means having a circumferentially disposed groove therein which groove has a bottom portion, an inner face and an outer face, said outer face being dimensioned so as to be in a spaced relationship with the tubular member outer wall when said tubular member is mounted in said groove; and a sealing material disposed between the outer wall of the tubular member and the outer face of said groove, wherein said sealing material is an oxide frit seal having a melting point in excess of approximately 1400° C., whereby said sealing material is placed under compression.

9. The improved lead vapor Raman cell according to claim 8 wherein the metal tubular member is niobium.

10. The improved lead vapor Raman cell according to claim 8 wherein the metal tubular member is tantalum.

11. The improved lead vapor Raman cell according to claim 8 wherein the metal tubular member is molybdenum.

12. The improved lead vapor Raman cell according to claim 8 including an intermediate layer disposed between the metal tubular member and the sealing material in order to improve the interface bond therebetween.

13. The improved lead vapor Raman cell according to claim 12 wherein the intermediate layer is selected from the group consisting of silicone, zirconium and titanium.

14. The improved lead vapor Raman cell according to claim 8 wherein the window is a C-axis sapphire window.

* * * * *